(12) United States Patent
Blasco Rueda et al.

(10) Patent No.: US 11,150,959 B2
(45) Date of Patent: Oct. 19, 2021

(54) HOB DEVICE

(71) Applicant: BSH Hausgeräte GmbH, Munich (DE)

(72) Inventors: Nicolas Blasco Rueda, Saragossa (ES); Sergio Llorente Gil, Saragossa (ES); Daniel Palacios Tomas, Saragossa (ES); David Valeau Martin, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 430 days.

(21) Appl. No.: 15/779,890

(22) PCT Filed: Nov. 24, 2016

(86) PCT No.: PCT/IB2016/057010
§ 371 (c)(1),
(2) Date: May 30, 2018

(87) PCT Pub. No.: WO2017/089944
PCT Pub. Date: Jun. 1, 2017

(65) Prior Publication Data
US 2018/0349200 A1 Dec. 6, 2018

(30) Foreign Application Priority Data

Dec. 18, 2015 (ES) ................. ES201531851

(51) Int. Cl.
G06F 9/50 (2006.01)
H05B 6/06 (2006.01)
H04L 12/24 (2006.01)

(52) U.S. Cl.
CPC ........ *G06F 9/5072* (2013.01); *H04L 41/0893* (2013.01); *H04L 41/5054* (2013.01); *H05B 6/062* (2013.01); *H05B 2213/05* (2013.01)

(58) Field of Classification Search
CPC ............... G06F 9/5072; H04L 41/0893; H04L 41/5054; H05B 6/062; H05B 2213/05
(Continued)

(56) References Cited

U.S. PATENT DOCUMENTS

| 4,426,564 A | | 1/1984 | Steigerwald et al. | |
|---|---|---|---|---|
| 5,096,725 A | * | 3/1992 | Kim ........................ | A47J 27/62 426/233 |

(Continued)

FOREIGN PATENT DOCUMENTS

| CN | 101309529 A | 11/2008 |
|---|---|---|
| CN | 102235700 A | 11/2011 |

(Continued)

OTHER PUBLICATIONS

National Search Report ES 201531851 dated May 10, 2016.
(Continued)

*Primary Examiner* — Hermon Asres
(74) *Attorney, Agent, or Firm* — Michael E. Tschupp; Andre Pallapies; Brandn G. Braun

(57) ABSTRACT

A hob device includes a power supply unit, a receiving unit configured to receive an item of information, and a control unit configured to control the power supply unit in an operating state and to access the receiving unit. The control unit is configured to deactivate the power supply unit in the operating state for an inactivity time interval and to access the receiving unit during the inactivity time interval.

22 Claims, 3 Drawing Sheets

(58) Field of Classification Search
USPC ..... 709/226; 219/112, 413, 425, 121.34, 68, 219/622
See application file for complete search history.

(56) References Cited

U.S. PATENT DOCUMENTS

| | | | | |
|---|---|---|---|---|
| 6,043,461 | A * | 3/2000 | Rolling | F24C 7/087 219/445.1 |
| 2002/0007387 | A1 * | 1/2002 | Ginsberg | G06F 9/44573 718/102 |
| 2002/0008632 | A1 | 1/2002 | Clothier | |
| 2003/0095034 | A1 * | 5/2003 | Clothier | G06K 7/0008 340/10.1 |
| 2010/0237065 | A1 | 9/2010 | Chen et al. | |
| 2011/0079591 | A1 * | 4/2011 | Parachini | H05B 6/065 219/620 |
| 2012/0043312 | A1 | 2/2012 | Lee et al. | |
| 2012/0150463 | A1 * | 6/2012 | Ozawa | G05B 15/02 702/62 |
| 2012/0312803 | A1 * | 12/2012 | Jeanneteau | H05B 6/065 219/622 |
| 2013/0008889 | A1 * | 1/2013 | Ogasawara | H05B 6/062 219/622 |
| 2013/0037535 | A1 * | 2/2013 | Ogasawara | H05B 6/062 219/622 |
| 2013/0082046 | A1 * | 4/2013 | Ogasawara | H05B 6/062 219/625 |
| 2013/0320000 | A1 * | 12/2013 | Shan | H05B 6/062 219/620 |
| 2014/0014650 | A1 * | 1/2014 | Viroli | H05B 6/062 219/626 |
| 2014/0158678 | A1 * | 6/2014 | Thomann | G01K 17/00 219/627 |
| 2015/0156824 | A1 * | 6/2015 | Viroli | H05B 6/062 219/621 |
| 2015/0250027 | A1 * | 9/2015 | Takano | H05B 6/062 219/664 |
| 2016/0037584 | A1 | 2/2016 | Viroli et al. | |

FOREIGN PATENT DOCUMENTS

| | | |
|---|---|---|
| ES | 2164595 | 2/2002 |
| WO | 2007042316 A1 | 4/2007 |

OTHER PUBLICATIONS

International Search Report PCT/IB2016/057101 dated Feb. 16, 2017.
National Search Report CN 201680074138.3 dated Jul. 23, 2020.

* cited by examiner

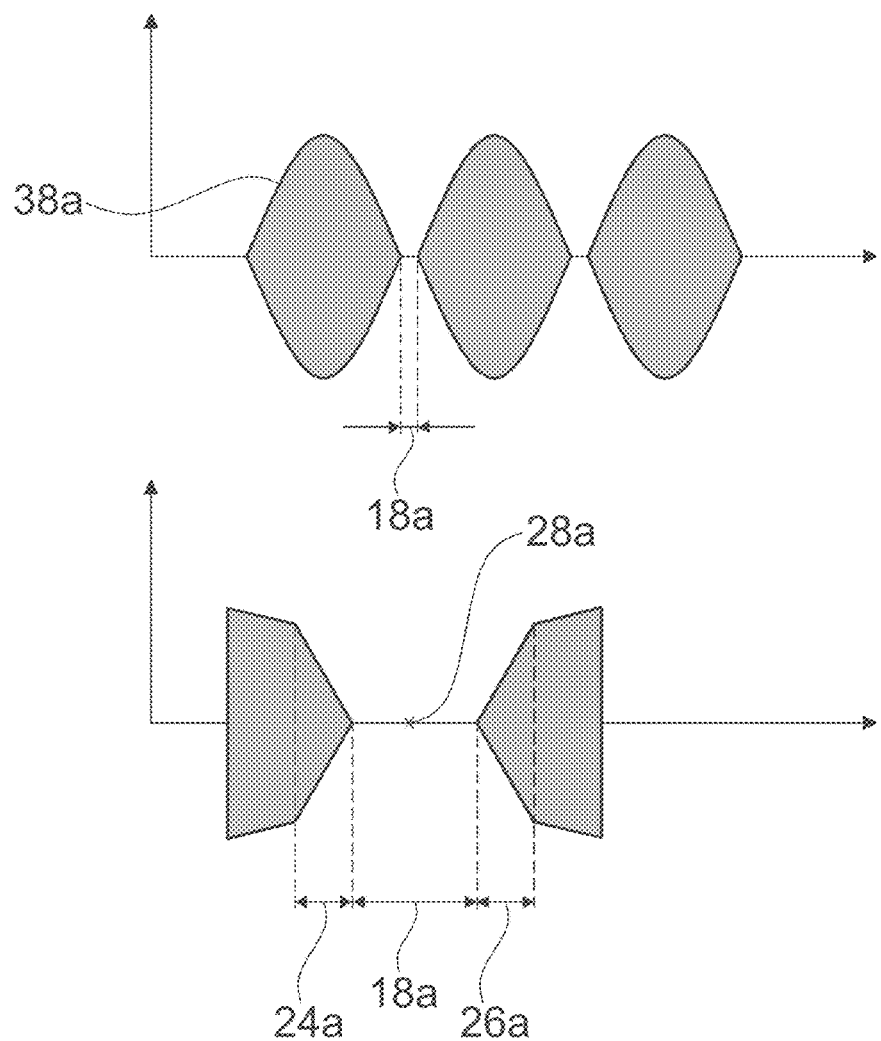
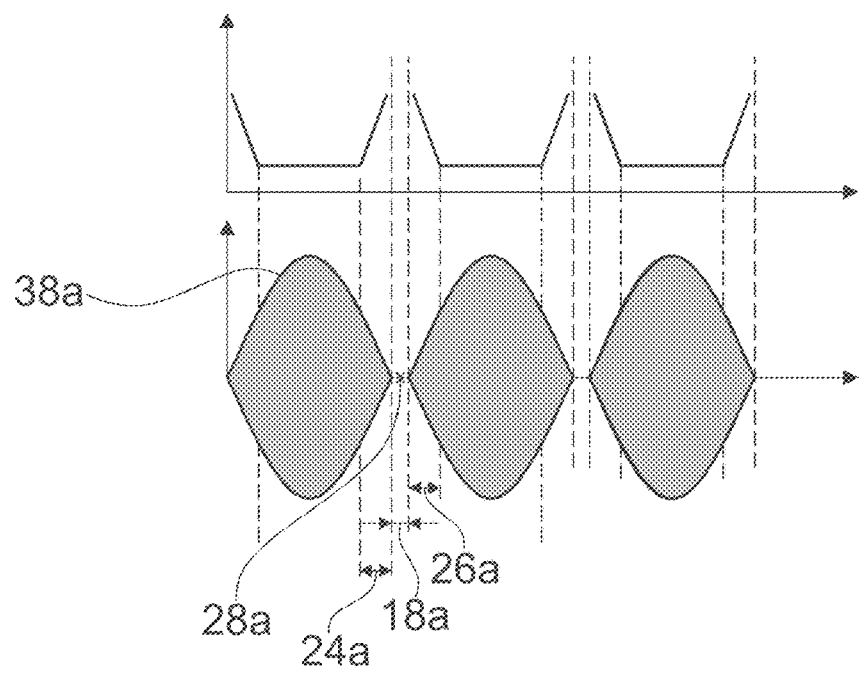
Fig. 3
Fig. 4

HOB DEVICE

CROSS-REFERENCES TO RELATED APPLICATIONS

This application is the U.S. National Stage of International Application No. PCT/IB2016/057101, filed Nov. 24, 2016, which designated the United States and has been published as International Publication No. WO 2017/103713 A1 and which claims the priority of Spanish Patent Application, Serial No. P201531851, filed Dec. 18, 2015, pursuant to 35 U.S.C. 119(a)-(d).

BACKGROUND OF THE INVENTION

The invention relates to a hob device according to the preamble of claim 1.

From the prior art there is known a hob device with a receiving unit for receiving an item of information. In an operating state, a control unit controls a power supply unit which, dependent upon the control by the control unit, feeds energy to heating units above which a cooking container is arranged. In the operating state, the control unit accesses the receiving unit which is influenced and disturbed by an alternating electromagnetic field resulting from the heating of the cooking container.

BRIEF SUMMARY OF THE INVENTION

The object of the invention lies in particular in providing an apparatus of the aforementioned type with advantageous operating properties.

The invention proceeds from a hob device, in particular an induction hob device comprising a receiving unit which is provided for receiving at least one item of information and a control unit which is provided, in at least one operating state, to control at least one power supply unit and to access the receiving unit.

It is proposed that the control unit is provided, in the operating state, to deactivate the power supply unit for an inactivity time interval and, during the inactivity time interval, to access the receiving unit. A "hob device" should be understood to be, in particular at least a part, in particular a subassembly of a hob, in particular an induction hob, wherein in particular accessory units for the hob can additionally be included, for example, a sensor unit for external measurement of a temperature of a cooking container and/or a cooking food item. In particular, the hob device can also consist of the whole hob, in particular the whole induction hob. A "receiving unit" should be understood as being, in particular, a preferably electric and/or electronic unit which is provided to obtain the information item actively, for example, by means of a request and/or by detection and/or by means of an analysis performed by the receiving unit and/or by a calculation performed by the receiving unit, and/or passively, for example, by means of an electrical signal reaching the receiving unit and/or an input, in particular an operating input. For example, the receiving unit could comprise at least one electrical component, for example, a resistor component and/or a coil and/or an inductor and/or a capacitor and/or a diode. The receiving unit could alternatively or additionally comprise a detection unit and/or a measuring unit. The detection unit and/or the measuring unit could have, in particular, at least one sensor, for example, a capacitive sensor and/or an inductive sensor and/or a pot recognition system and/or an NTC resistor and/or a PTC resistor and/or an acceleration sensor and/or a weight sensor and/or an acoustic sensor and/or a microphone and/or an optical sensor and/or a vibration sensor and/or a strain gauge sensor. Alternatively or additionally, the receiving unit could comprise, in particular, a communication unit which could be provided, in particular, for a communication with a further unit, for example, with the control unit. The receiving unit could comprise, in particular, an operator interface and/or a hob electronic system. The user interface could be provided, in particular, for the input and/or selection of operating parameters. In particular, the electronics unit is different from a switching element. An "item of information" should be understood, in particular, as a physical and/or chemical property and/or characteristic variable. The item of information is different, in particular, from an item of switching information. For example, the information could be, in particular a temperature and/or a magnetic field and/or an electric field. The electric field could be, for example, an electric field of an operating element, in particular, a touch operating element. In particular, the item of information could be an electrical and/or electronic and/or electromagnetic signal which characterizes and/or defines, in particular, at least one characteristic variable. Alternatively or additionally, the item of information could be a signal provided, in particular, for a communication between different electronic units. The item of information could be, for example, an electrical voltage and/or an electrical current. Alternatively or additionally, the information could be, in particular, a bar code and/or a data stream and/or a file. The information could alternatively or additionally be an electromagnetic field and/or an electromagnetic radiation. The electromagnetic radiation could be, for example, infrared radiation and/or a radio signal. In particular, the information could be an optical and/or acoustic signal. A "control unit" should be understood to be, in particular, an electronic unit which is preferably at least partially integrated into a control and/or regulating unit of a hob and which is preferably provided to control and/or regulate at least the power supply unit. Preferably, the control unit comprises a computer unit and, in particular, in addition to the computer unit, a storage unit with a control and/or regulating program stored therein, which is provided to be carried out by the computer unit. In particular, the hob device comprises at least the power supply unit. A "power supply unit" should be understood, in particular, to be a unit which is provided, in the operating state, to provide energy, in particular electrical energy to supply to at least one heating unit. The power supply unit is provided, in particular, to provide in the operating state at least an, in particular, high-frequency supply current which is provided in particular to at least one heating unit and/or for heating at least one heating unit. The supply current is, in particular, a high-frequency alternating current. In particular, the power supply unit comprises at least one inverter which is provided to supply energy and/or to provide the, in particular, high-frequency supply current and/or to supply the heating unit. In particular, the control unit is provided, in the operating state, to transmit at least one signal, in particular at least a command signal to the power supply unit and, in particular by means of the signal, to control and/or regulate at least one action of the power supply unit. In particular, the control unit is provided, in the operating state, by means of the signal to stimulate the power supply unit to supply the, in particular, high-frequency supply current. The control unit is, in particular, provided in the operating state, to control and/or regulate, in particular by means of the signal, at least one switching frequency of the power supply unit, in particular of the inverter of the power supply unit. In particular, the hob device has at least one heating unit, in particular at least two, advantageously at least four, particularly advantageously at least eight and preferably a large number of heating units. For example, the control unit could be provided to control and/or regulate the receiving unit in the operating state. The control unit could be provided, in particular, in the operating state to initiate at least one action of the receiving unit, in particular actively and advantageously by means of at least one signal transmitted to the receiving unit. Alternatively or additionally, the control unit could be provided, in particular, in the operating state, to read out from the receiving unit and/or at least a characteristic variable characterizing the item of information received by the receiving unit, wherein the receiving unit could be, for example, a resistor component for the detection of a voltage. During the inactivity time interval, a switching frequency of the power supply unit, in particular of the inverter of the power supply unit, assumes in particular a value of at least substantially zero. In particular, an energy supplied by the power supply unit amounts during the inactivity time interval to substantially zero. A current flow through the heating unit which is provided, in particular, for a supply by the power supply unit amounts during the inactivity time interval, in particular, to substantially zero. In particular, a high-frequency supply current supplied by the power supply unit amounts during the inactivity time interval at least to substantially zero. "Provided" should be understood, in particular, as especially programmed, designed and/or equipped. That an object is provided for a particular function should be understood as meaning that the object fulfils and/or carries out this particular function in at least one usage and/or operational state.

By means of the inventive design, in particular, advantageous operational properties can be achieved. During the inactivity time interval, in particular, a high degree of measuring accuracy of the receiving unit, which has, in particular, a high degree of susceptibility to electromagnetic disturbances, and/or a low-disturbance provision of a characteristic variable characterizing and/or identifying the information can be achieved. In particular, electromagnetic interference which can be caused, in particular, by an alternating electromagnetic field supplied by the power supply unit and/or flicker can be effectively prevented. Due to the accessing of the receiving unit in the inactivity time interval, in particular, simple and/or less expensive components can be used for the electronics unit, so that in particular, low costs can be enabled.

In a preferred embodiment, it is proposed that the receiving unit comprises a detection unit and is provided, in the operating state, to detect at least one characteristic variable by means of the detection unit during the inactivity time interval. For example, the detection unit could be at least one electrical component which could be provided for receiving an electrical signal characterizing and/or defining the characteristic variable. Alternatively or additionally, the detection unit could have at least one sensor which could be provided for the detection of the characteristic variable. A "sensor" should be understood, in particular, to mean at least one element which comprises at least one detector for detecting at least one sensor characteristic variable and is provided to output a value characterizing the sensor characteristic variable, wherein the sensor characteristic variable is advantageously a physical and/or chemical variable. By this means, in particular, a disturbance-free and/or precise detection of the characteristic variable can be achieved.

In a particularly preferred embodiment, it is proposed that the receiving unit is provided, in the operating state, to detect by means of the detection unit during the inactivity time interval at least one temperature characteristic variable of a cooking container put in place, and in particular heated. The characteristic variable is, in particular, a temperature characteristic variable. A "temperature characteristic variable" should be understood, in particular to be a characteristic variable which defines a temperature and/or represents a measure for a value of a temperature. The temperature characteristic variable could be, in particular, a temperature. Alternatively or additionally, the temperature characteristic variable could be, in particular, an electromagnetic signal, for example, an electromagnetic field and/or an electromagnetic radiation. Alternatively or additionally, the temperature characteristic variable could be, in particular, an electrical characteristic variable, in particular an electrical voltage and/or an electrical current. By this means, in particular, optimum cooking results and/or execution of an automated cooking process can be enabled.

It is further proposed that the receiving unit is provided, in the operating state, to detect a cooking container put in place, by means of the detection unit during the inactivity time interval. The characteristic variable is, in particular, a signal characterizing a presence of a cooking container and/or an absence of a cooking container. By this means, in particular, a faulty detection of a cooking container can be prevented and/or the cooking container, in particular a position and/or a size and/or a material of the cooking container can be precisely detected.

The receiving unit could comprise, for example, a user interface and be provided for receiving at least one item of information which could be, in particular, an operating signal. Preferably, the receiving unit comprises a communication unit and is provided, in the operating state, to participate by means of the communication unit in at least one communication during the inactivity time interval. In particular, the receiving unit is provided, in the operating state, during the inactivity time interval to transmit and/or receive by means of the communication unit, at least one characteristic variable, in particular the characteristic variable, and/or at least one parameter. The communication unit could be provided, for example, for a wire-bound communication. Alternatively or additionally, the communication unit could be provided, in particular, for a wireless communication. By this means, in particular, an error-free communication can be ensured. In particular, characteristic variables and/or parameters can be transmitted error-free.

In addition, it is proposed that the inactivity time interval is not more than 7 ms, in particular not more than 5 ms, advantageously not more than 3 ms, particularly advantageously not more than 1 ms and preferably not more than 0.1 ms. By this means, in particular, a short inactivity time interval can be achieved and, associated therewith, a large quantity of energy of a heating unit can be made available for heating a cooking container placed thereon.

It is further proposed that the control unit is provided, in the operating state, during a first time interval after which the inactivity time interval directly follows chronologically, to operate the power supply unit at a switching frequency which continuously changes in value. In particular, the control unit is provided, in the operating state, continuously to change the value of a frequency of the, in particular, high-frequency supply current supplied by the power supply unit. The control unit is in particular provided, in the operating state, to control at least one inverter of the power supply unit, in particular at least one switching element of at least one inverter of the power supply unit and in particular continuously to change the value of the switching frequency. In particular, the control unit is provided, in the operating state, by means of the continuous changing of the value of the switching frequency, to change an envelope curve of an electrical supply current flowing through at least one heating unit. By this means, in particular, a high efficiency level and/or a flexible influencing of an electrical supply current flowing through at least one heating unit can be achieved. In particular, an envelope curve of an electrical supply current flowing through at least one heating unit can be rapidly reduced to zero, by which means in particular a noise generation resulting from a discontinuous changing of the electrical supply current can be prevented. The occurrence of flicker in particular can be prevented and/or a frequency of an occurrence of flicker can be reduced. In particular, low losses in the power supply unit and/or an energy-saving embodiment can be achieved.

It is further proposed that the control unit is provided, in the operating state, during a second time interval which directly follows chronologically after the inactivity time interval, to operate the power supply unit at a switching frequency which continuously changes in value. By this means, in particular, a high efficiency level and/or a flexible influencing of an electrical supply current flowing through at least one heating unit can be achieved. In particular, an envelope curve of a supply current flowing through at least one heating unit can be rapidly increased starting from zero, so that, in particular, a noise generation resulting from a discontinuous changing of the electrical supply current can be prevented. An occurrence of flicker, in particular, can be prevented and/or a frequency of an occurrence of flicker can be reduced. In particular, low losses in the power supply unit and/or an energy-saving embodiment can be achieved.

It is additionally proposed that the control unit is provided, in the operating state, to arrange the inactivity time interval at least substantially symmetrically about a zero crossing of a supply voltage, in particular a power grid voltage. The supply voltage is, in particular, an alternating voltage. For example, the supply voltage could have a frequency with a value of substantially 50 Hz. In particular, a period duration of the supply voltage could have a value of at least substantially 20 ms. Alternatively, the supply voltage could have, in particular, a frequency with a value of substantially 60 Hz, wherein the period duration of the supply voltage could, in particular, have a value of at least substantially 16.7 ms. In particular, a deviation of a mid-point of the inactivity time interval from the zero crossing of the supply voltage is not more than 1 ms, in particular not more than 0.7 ms, advantageously not more than 0.3 ms and particularly advantageously not more than 0.1 ms. In particular, a deviation of a mid-point of the inactivity time interval from the zero crossing of the supply voltage is not more than 15%, in particular not more than 10%, advantageously not more than 5%, particularly advantageously not more than 3% and preferably not more than 1% of a total duration of the inactivity time interval. By this means, in particular, an energy-saving and/or efficient configuration can be achieved.

It is additionally proposed that the control unit is provided, in the operating state, to arrange the inactivity time interval at least substantially asymmetrically about a zero crossing of a supply voltage. In particular, a deviation of a mid-point of the inactivity time interval from the zero crossing of the supply voltage is greater than 1 ms, in particular greater than 0.7 ms, advantageously greater than 0.3 ms and particularly advantageously greater than 0.1 ms. In particular, a deviation of a mid-point of the inactivity time interval from the zero crossing of the supply voltage is greater than 15%, in particular greater than 10%, advantageously greater than 5%, particularly advantageously greater than 3% and preferably greater than 1% of the total duration of the inactivity time interval. By this means, in particular, a high degree of flexibility can be achieved.

Particularly advantageous operating properties can be achieved by a hob, in particular an induction hob, comprising at least one inventive hob device, in particular with at least one inventive induction hob device.

The advantageous operating properties can be further enhanced by a method for operating an inventive hob device, in particular an inventive induction hob device, having a receiving unit which is provided for receiving at least one item of information, wherein in at least one operating state, at least one power supply unit is controlled and the receiving unit is accessed, and wherein, in the operating state, the power supply unit is deactivated for an inactivity time interval and during the inactivity time interval, the receiving unit is accessed.

The hob device should not be restricted to the use and embodiment described above. In particular, the hob device can have, for a fulfillment of a functional method described herein, a number of individual elements, components and units deviating from a number mentioned herein.

Further advantages are revealed in the following description of the drawings. The drawings show exemplary embodiments of the invention. The drawings, the description and the claims contain numerous features in combination. A person skilled in the art would also suitably consider the features individually and group them into further useful combinations.

In the drawings:

BRIEF DESCRIPTION OF THE DRAWINGS

FIG. 3 shows a temporal sequence of a supply current supplied by a power supply unit of the hob device and a disproportionately enlarged portion of the supply current in a schematic representation, not to scale, FIG. 4 shows a temporal sequence of a switching frequency of the power supply unit and of the supply current in a schematic representation, not to scale.

DETAILED DESCRIPTION OF EXEMPLARY EMBODIMENTS OF THE PRESENT INVENTION

Figure 1:
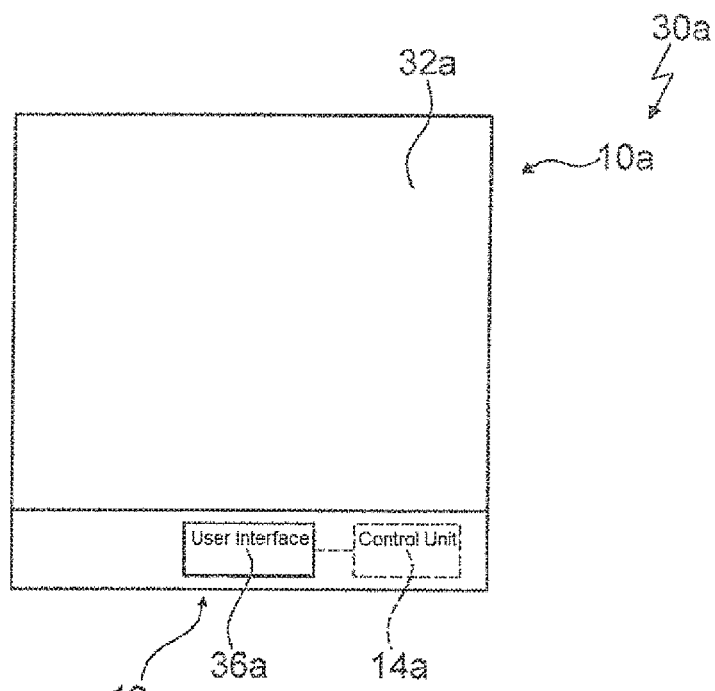
FIG. 1 shows a hob with a hob device in a schematic plan view.

FIG. 1 shows a hob 30a which is configured as an induction hob, having a hob device 10a which is configured as an induction hob device. The hob device 10a comprises a hob plate 32a. In an assembled state, the hob plate 32a forms part of a hob outer housing. The hob plate 32a is provided for the placement of cooking containers.

Figure 2:
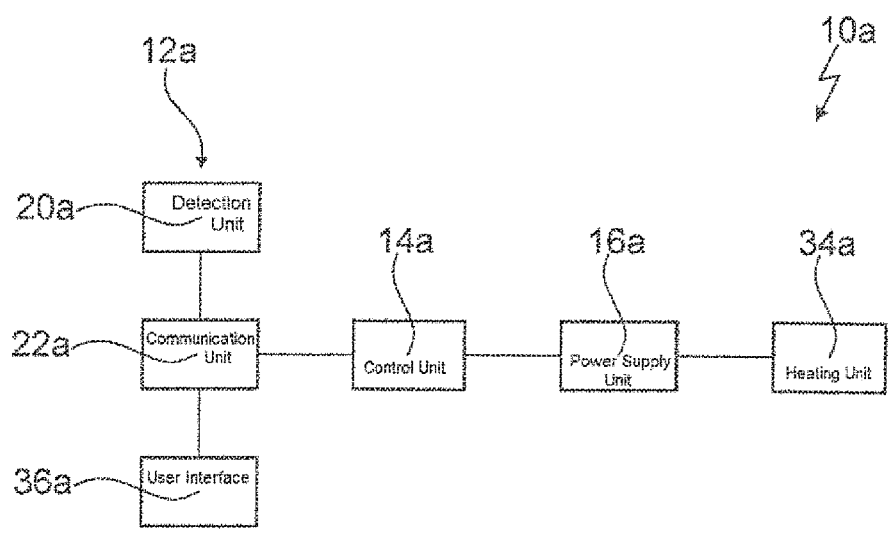
FIG. 2 shows a schematic representation of a relation between different units of the hob device.

The hob device 10a has a plurality of heating units 34a (see FIG. 2). For example, the heating units could be arranged in the form of a matrix. The heating units could, in particular, be part of a variable cooking surface region.

Alternatively, the heating units can, in particular, be part of a classic hob in which in particular, heating units fixedly specified and defined by a position of the heating units could exist which, in particular, could be marked on the hob plate.

Just one of the heating units 34a will now be described. The heating unit 34a is provided in order to heat cooking containers placed on the hob plate 32a above the heating unit 34a. The heating unit 34a is configured as an induction heating unit.

The hob device 10a comprises the receiving unit 12a. The receiving unit 12a is provided for receiving an item of information. The receiving unit 12a is a unit which has a high degree of susceptibility to electromagnetic disturbances.

The receiving unit 12a comprises a user interface 36a (see FIGS. 1 and 2). The user interface 36a is provided for an input and/or selection of operating parameters, for example a heating output and/or a heating output density and/or a heating zone.

The hob device 10a comprises a control unit 14a (see FIGS. 1 and 2). In an operating state, the control unit 14a accesses the receiving unit 12a. The control unit 14a regulates an energy supply to the heating unit 34a in the operating state.

The hob device 10a comprises a power supply unit 16a (see FIG. 2). In the operating state, the power supply unit 16a supplies energy to a supply of the heating unit 34a. In the operating state, the power supply unit 16a supplies a supply current 38a to a supply of the heating unit 34a (see FIGS. 3 and 4). The power supply unit 16a is intended to be controlled by the control unit 14a.

The control unit 14a controls the power supply unit 16a in the operating state for the regulation of the energy supply to the heating unit 34a. In the operating state, depending upon a control by the control unit 14a, the power supply unit 16a supplies the supply current 38a to a supply of the heating unit 34a.

In the operating state, the control unit 14a deactivates the power supply unit 16a for an inactivity time interval 18a (see FIGS. 3 and 4). An energy supplied by the power supply unit 16a to the supply of the heating unit 34a amounts during the inactivity time interval 18a to substantially zero. During the inactivity time interval 18a, the control unit 14a accesses the receiving unit 12a. During the accessing of the receiving unit 12a, the control unit 14a extracts from the receiving unit 12a a characteristic variable characterizing an item of information received by the receiving unit 12a.

The receiving unit 12a comprises a detection unit 20a (see FIG. 2). In the operating state, during the inactivity time interval 18a, the receiving unit 12a detects a plurality of characteristic variables by means of the detection unit 20a. Just one of the characteristic variables will now be described.

The detection unit 20a is provided for detection of a cooking container (not shown) that is in place. For example, the detection unit could be configured at least partially integrally with the heating unit. In the operating state, during the inactivity time interval 18a, by means of the detection unit 20a, the receiving unit 12a detects cooking containers that have been placed. In the operating state, during the inactivity time interval 18a, by means of the detection unit 20a, the receiving unit 12a detects whether a cooking container is in place above the heating unit 34a.

The receiving unit 12a comprises a communication unit 22a (see FIG. 2). The communication unit 22a is provided for a communication with a further unit. In the operating state, the communication unit 22a communicates with units of the receiving unit 12a, for example with the detection unit 20a and/or with the operator interface 36a. In the operating state, the communication unit 22a communicates with units differing from the receiving unit 12a, for example, with the control unit 14a.

In the operating state, during the inactivity time interval 18a, the receiving unit 12a participates in a plurality of communications by means of the communication unit 22a. Just one of the communications will now be described.

In the operating state, the receiving unit 12a participates during the inactivity time interval 18a by means of the communication unit 22a in a communication with the control unit 14a. In the event of the presence of a cooking container above the heating unit 34a, in the operating state, the receiving unit 12a makes a characteristic variable characterizing the presence of a cooking container available to the control unit 14a. In the event of the absence of a cooking container above the heating unit 34a, in the operating state, the receiving unit 12a makes a characteristic variable characterizing the absence of a cooking container available to the control unit 14a.

The detection unit 20a comprises a sensor (not shown). In the present exemplary embodiment, the detection unit 20a has a temperature sensor. In the operating state, during the inactivity time interval 18a, by means of the detection unit 20a, the receiving unit 12a detects a temperature characteristic variable of a cooking container that is in place. In the present exemplary embodiment, the temperature characteristic variable is a characteristic variable that characterizes a temperature of the cooking container that is in place. In the operating state, the receiving unit 12a makes the temperature characteristic variable available to the control unit 14a.

Dependent upon an operating input by means of the user interface 36a, in the operating state, during the inactivity time interval 18a the receiving unit 12a makes a characteristic variable characterizing the operating input available to the control unit 14a. The control unit 14a is provided, dependent upon operating parameters input by means of the user interface 36a, to carry out actions and/or to change settings.

In the present exemplary embodiment, the inactivity time interval 18a is substantially 1 ms. In the operating state, the control unit 14a arranges the inactivity time interval 18a substantially symmetrically about a zero crossing 28a of a supply voltage (see FIGS. 3 and 4). A mid-point of the inactivity time interval 18a corresponds substantially to the zero crossing 28a of the supply voltage.

In the operating state, during a first time interval 24a after which the inactivity time interval 18a directly follows chronologically, the control unit 14a operates the power supply unit 16a at a switching frequency which continuously changes in value (see FIG. 4). In the operating state, during the first time interval 24a, the control unit 14a monotonically reduces an energy supplied by the power supply unit 16a to a value of substantially zero.

Starting from the value of substantially zero, in the operating state, during a second time interval 26a which directly follows chronologically after the inactivity time interval 18a, the control unit 14a monotonically increases an energy supplied by the power supply unit 16a. In the operating state, during the second time interval 26a, the control unit 14a operates the power supply unit 16a at a switching frequency which continuously changes in value (see FIG. 4).

In a method for operating the hob device 10a, in the operating state, the power supply unit 16a is controlled. In a further method step, in the operating state, the power supply unit 16a is deactivated for the inactivity time interval 18a. In the operating state, in a further method step, the receiving unit 12a is accessed during the inactivity time interval 18a.

Figure 5:
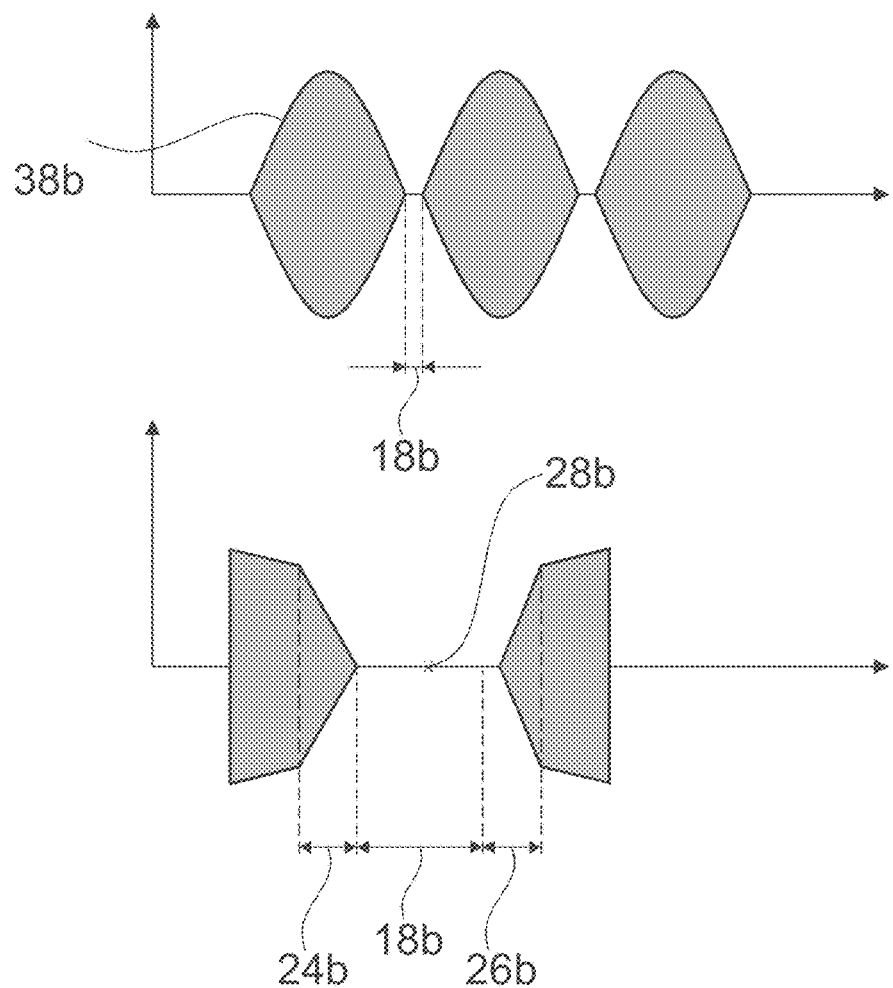
FIG. 5 shows a temporal sequence of a supply current supplied by a power supply unit of an alternative hob device and a disproportionately enlarged portion of the supply current in a schematic representation, not to scale.
Figure 6:
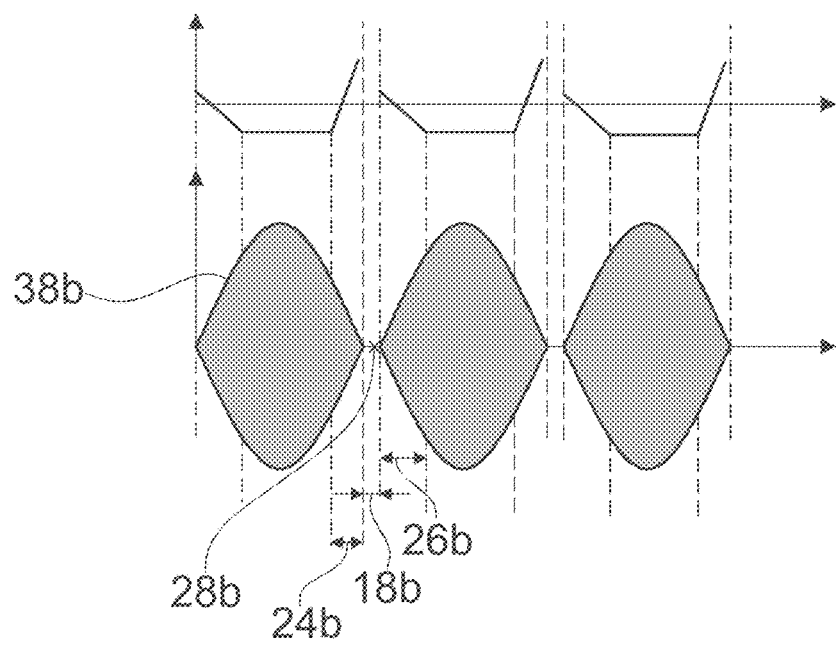
FIG. 6 shows a temporal sequence of a switching frequency of the power supply unit and of the supply current in a schematic representation, not to scale.

FIGS. 5 and 6 show a further exemplary embodiment of the invention. The following description is essentially restricted to the differences between the exemplary embodiments, wherein with regard to components, features and functions which remain the same, reference can be made to the description of the exemplary embodiment in FIGS. 1 to 4. In order to differentiate the exemplary embodiments, the letter a is replaced in the reference characters in FIGS. 1 to 4 by the letter b in the reference characters of the exemplary embodiment of FIGS. 5 and 6. With regard to components that remain the same, in particular with regard to components with the same reference characters, in principle, reference can be made to the drawings and/or the description of the exemplary embodiment of FIGS. 1 to 4.

A control unit 14b of an alternative hob device 10b controls, in an operating state, a power supply unit 16b of the hob device 10b. In the operating state, the control unit 14b deactivates the power supply unit 16b for an inactivity time interval 18b (see FIGS. 5 and 6).

In the operating state, the control unit 14b arranges the inactivity time interval 18b substantially asymmetrically about a zero crossing 28b of a supply voltage (see FIGS. 5 and 6). A mid-point of the inactivity time interval 18b and of the zero crossing 28a of the supply voltage are arranged spaced from one another. In the present exemplary embodiment, a deviation of the mid-point of the inactivity time interval 18b from the zero crossing 28b of the supply voltage is greater than 0.3 ms. In the inactivity time interval 18b, the control unit 14b accesses the receiving unit 12b.

The invention claimed is:

1. A hob device, comprising:
    a power supply unit configured to provide energy for a heating unit;
    a receiving unit configured to receive an item of information; and
    a control unit configured to control the power supply unit in an operating state and to access the receiving unit, said control unit configured to deactivate the power supply unit during the operating state for an inactivity time interval and to access the receiving unit during the inactivity time interval, the control unit extracting the item of information from the receiving unit during the inactivity time interval,
    wherein the control unit controls the power supply such that the power supply provides the energy for the heating unit before the inactivity time interval and after the inactivity time interval,
    the inactivity time interval is at most 7 ms, and
    the energy supplied by the power supply unit is substantially zero during the inactivity time interval.

2. The hob device of claim 1, wherein the receiving unit comprises a detection unit to detect a characteristic variable in the operating state during the inactivity time interval.

3. The hob device of claim 2, wherein the characteristic variable is a temperature characteristic variable of a placed cooking container.

4. The hob device of claim 2, wherein the receiving unit is able to detect with the detection unit a placement of a cooking container during the inactivity time interval.

5. The hob device of claim 1, wherein the receiving unit comprises a communication unit to participate in the operating state with the communication unit in at least one communication during the inactivity time interval.

6. The hob device of claim 1, wherein in the operating state the control unit is configured to operate the power supply unit at a switching frequency which continuously changes in value during a time interval after which the inactivity time interval directly follows chronologically.

7. The hob device of claim 1, wherein in the operating state the control unit is configured to operate the power supply unit at a switching frequency which continuously changes in value during a time interval which directly follows chronologically after the inactivity time interval.

8. The hob device of claim 1, wherein in the operating state the control unit is configured to arrange the inactivity time interval at least substantially symmetrically about a zero crossing of a supply voltage.

9. The hob device of claim 1, wherein in the operating state the control unit is configured to arrange the inactivity time interval at least substantially asymmetrically about a zero crossing of a supply voltage.

10. A hob, comprising a hob device, said hob device comprising a power supply unit configured to provide energy for a heating unit, a receiving unit configured to receive an item of information, and a control unit configured to control the power supply unit in an operating state and to access the receiving unit, said control unit configured to deactivate the power supply unit in the operating state for an inactivity time interval and to access the receiving unit during the inactivity time interval,
    wherein the control unit controls the power supply such that the power supply provides the energy for the heating unit before the inactivity time interval and after the inactivity time interval,
    the inactivity time interval is at most 7 ms, and
    the energy supplied by the power supply unit is substantially zero during the inactivity time interval.

11. The hob of claim 10, constructed in the form of an induction hob.

12. A method for operating a hob device, comprising:
    activating a power supply unit configured to provide energy for a heating unit in an operating state of the hob device;
    deactivating the power supply unit in the operating state for an inactivity time interval; and
    accessing a receiving unit of the hob device during the inactivity time interval to retrieve an item of information received in the receiving unit,
    wherein the energy is provided by the power supply for the heating unit before the inactivity time interval and after the inactivity time interval,
    the inactivity time interval is at most 7 ms, and
    the energy supplied by the power supply unit is substantially zero during the inactivity time interval.

13. The method of claim 12, further comprising detecting by the receiving unit in the operating state a characteristic variable during the inactivity time interval.

14. The method of claim 13, wherein the characteristic variable is a temperature characteristic variable of a placed cooking container.

15. The method of claim 12, further comprising detecting by the receiving unit a placement of a cooking container during the inactivity time interval.

16. The method of claim 12, further comprising participation by the receiving unit in the operating state in at least one communication during the inactivity time interval.

17. The method of claim 12, further comprising operating the power supply unit at a switching frequency which continuously changes in value during a time interval after which the inactivity time interval directly follows chronologically.

18. The method of claim 12, further comprising operating the power supply unit at a switching frequency which continuously changes in value during a time interval which directly follows chronologically after the inactivity time interval.

19. The method of claim 12, further comprising arranging the inactivity time interval at least substantially symmetrically about a zero crossing of a supply voltage.

20. The method of claim 12, further comprising arranging the inactivity time interval at least substantially asymmetrically about a zero crossing of a supply voltage.

21. The method of claim 12, further comprising detecting by the receiving unit a presence of a cooking container on the heating unit during the inactivity time interval.

22. The hob device of claim 1, wherein, in the operating state, a first time interval immediately precedes the inactivity time interval, and the inactivity time interval immediately precedes a second time interval, the control unit monotonically reduces the energy supplied by the power supply during the first time interval, and the control unit monotonically increase the energy supplied by the power supply during the second time interval.

* * * * *